Oct. 26, 1926.
A. L. JACOBSON
1,604,579
TIRE VULCANIZING APPARATUS
Original Filed Nov. 19, 1924  2 Sheets-Sheet 1
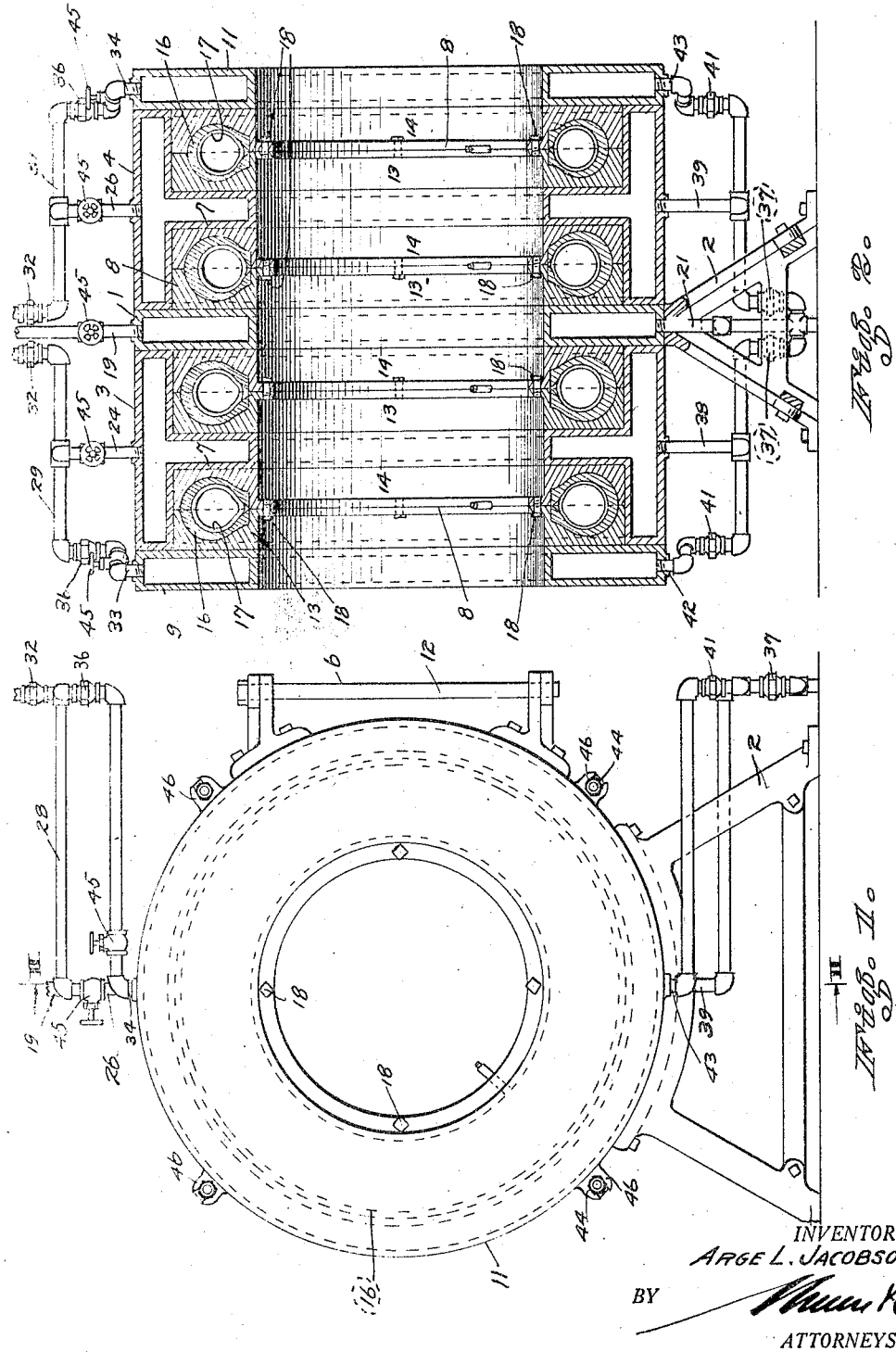
INVENTOR.
ARGE L. JACOBSON
BY
ATTORNEYS.

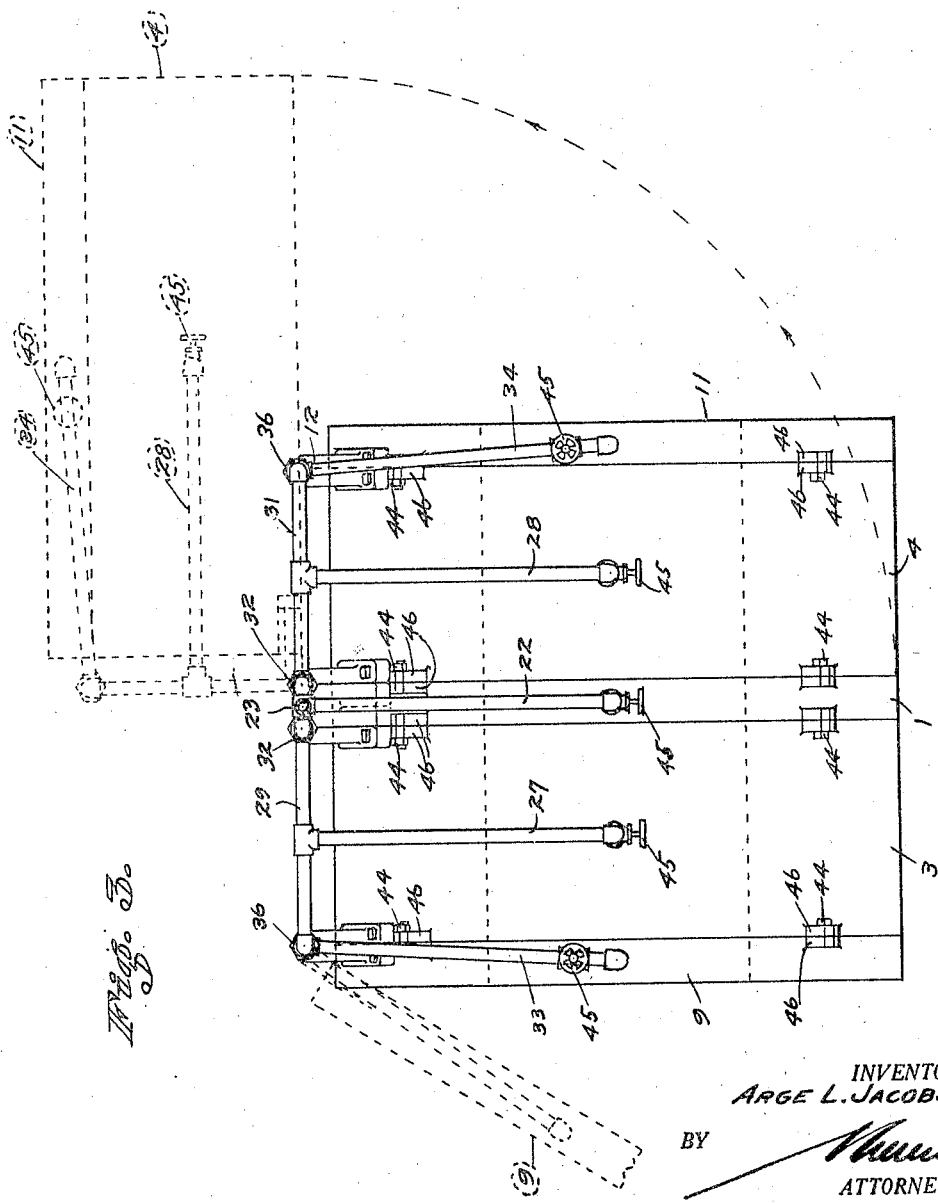

Patented Oct. 26, 1926.

1,604,579

UNITED STATES PATENT OFFICE.

ARGE LEO JACOBSON, OF SAN FRANCISCO, CALIFORNIA.

TIRE-VULCANIZING APPARATUS.

Application filed November 19, 1924, Serial No. 750,863. Renewed August 4, 1926.

The present invention relates to improvements in tire vulcanizing apparatus, and its particular object is to provide a simple apparatus for vulcanizing the tire of a motor vehicle in such a manner that the tires during the vulcanizing process remain out of contact with the heating medium.

The device described in the present application is an improvement on the apparatus described in my Patent No. 1,380,966, dated June 7th, 1921, and while the same principle governs both devices, I have found through actual experience that the device described in this application provides more convenient manipulating means, and particularly allows a number of tires to be vulcanized simultaneously in one apparatus without materially increasing or rendering more difficult the work necessary to manipulate the device.

The underlying principle of my former patent was the placing of each individual tire in a mold and of surrounding the mold on the sides and the outer periphery with hollow rings adapted to allow steam to circulate therethrough for heating the molds, the principal advantage of this arrangement being that the steam is absolutely confined to the spaces within the rings and at no time has an opportunity of coming in actual contact with the mold or with the tire itself. While this principle is adhered to in the present invention, a radical departure has been made in the means for mounting the heating rings and the molds. While in the former invention molds and heating rings were placed in alternating relation into a hollow wall receptacle which made it necessary for the attendant to stoop over the heated vessel for manipulating various steam valves and which, furthermore, allowed of removal of the molds in a certain succession, it is proposed in the present invention to hingely connect the rings enclosing the molds so that each mold may be handled at any time without disturbing the arrangement of the other molds and so as to make it easier for the operator to gain access to each individual mold or chamber.

Further objects and advantages of my new arrangement will appear as the specification proceeds.

The preferred form of my invention is illustrated in the accompanying drawing, in which Figure 1 shows an end view of my device.

Figure 2 a vertical section taken along line II—II of Figure 1, and

Figure 3 is a top plan view of the same.

While I have shown only the preferred form of the invention, it should be understood that various changes or modifications may be made within the scope of the claims hereto attached without departing from the spirit of the invention.

The general principle of the present invention as distinguished from the prior disclosure, is the hinged connection between the various elements of the device. While any number of units may, of course, be hingedly connected, I have selected for the purpose of illustration, a device adapted to handle four molds at one time. It should be understood, of course, that the same principle may be applied to a device handling only one or two molds, and also to a device handling a larger number of molds. For a four unit arrangement, my preferred form includes a central hollow ring 1 disposed stationarily on a suitable base 2 which may be made of any desired form, the ring being rather flat as shown in the drawing and standing in a vertical plane. Two other rings 3 and 4 of the same outside diameter but of considerably larger inner diameter are hinged to the first ring by means of vertical pins 6 so that they may be swung from a position adjacent to the first ring into a position where they form, at least, a right angle with the first ring, as shown in dotted lines in Figure 3. These rings which are also hollow are T-shaped in cross-section so as to present an inwardly extending hollow flange 7 which is adapted to form with the first ring 1 and the beam of the T a chamber made to accommodate one of the molds 8. Further rings 9 and 11, corresponding in size and form to the first ring 1, are hinged to the rings 3 and 4 respectively, as shown at 12, so that the latter rings may be swung outwardly relative to the rings 3 and 4 in the manner shown in dotted lines in Figure 3. It will be seen that these rings 9 and 11 when closed upon the rings 3 and 4 form an additional pair of chambers for two further molds 8 on the outer sides of the flanges 7, so that in all by this arrangement four different chambers for four different molds are formed and that each of the four chambers is individually accesible by swinging the rings on their respective hinges.

The molds have been described in the prior disclosure and it may briefly be stated that they consist of two opposing dies 13 and 14 forming an annular core in which the tire 16 and the air bag 17 within the tire may be placed, the two dies being tightened upon one another by any suitable means, as by the bolts 18. The molds all have the same thickness and the same diameter so that they are interchangeable for the different diameters although, of course, they may be formed differently interiorly for the reception of different types and sizes of tires.

Each of the hollow spaces formed in the rings has an individual means for circulating steam therethrough, and the spaces do not intercommunicate with one another, so that the whole circulating system remains unaffected by any manipulation of the various rings as well as by the insertion and removal of the molds. The pipes leading steam into and out of the various hollow spaces within the rings may, of course, be arranged in many different ways to allow of swinging motion of the rings without interfering with the circulating system. One way is illustrated in the drawings, in which a central pipe 19 leads steam into the central ring 1 from the top while a second pipe 21 allows the steam to leave the central ring through the bottom. The pipe 19 which rises vertically from the center of the ring 1 communicates with a horizontal pipe 22 extending rearwardly and being connected with the main vertical supply pipe 23. The rings 3 and 4 receive their steam through the vertical pipes 24 and 26 communicating with the horizontal pipes 27, 28, which latter run parallel to the pipe 22 and connect with horizontal pipes 29 and 31. These pipes connect with the vertical supply pipe 23 but have swivel joints 32 incorporated therein, the latter joints being arranged coaxially with the hinges 6.

The rings 9 and 11 are fed through the pipes 33 and 34 communicating with the pipes 29 through the swivel joints 36 disposed so as to be coaxial with the hinges 12.

The discharge pipes for the different rings are arranged in the same manner as the feed pipes, the swivel joints 37 for the discharge pipes 38 and 39 being disposed in vertical alinement with the hinges 6 and the swivel joints 41 for the discharge pipes 42 and 43 being alined with the outer hinges 12. Suitable valves 45 are provided for regulating the admission of steam.

The rings when closed upon one another may be fastened together by any suitable means as, for instance, by the screws 44 passing through registering lugs 46.

The manner of operating my device will be readily understood from the foregoing description. The steam after being turned on need not be interfered with during the entire operation, although of course, it may be deemed advisable to close the valves 45 while the mold is removed so as to stop circulation of steam. The tires are first assembled, together with the air bags, in the molds 8 and inflated, preferably to a pressure of 150 pounds. Either one of the rings 3 and 4 may be swung into the dotted line position shown in Figure 3, and the molds inserted on the inside thereof whereupon they may be closed upon the stationary ring 1 so that the two inner molds 8 are safely in place. Thereupon the two outer rings 9 and 11 may be swung outwardly on their hinges and two additional molds may be accommodated. When all the molds are in place, each one is surrounded on three sides by hollow rings through which the steam circulates, so that all the molds are heated at the same rate while the steam is kept out of direct contact with the molds as well as with the tires. After the time for vulcanizing the tire has expired, the two outer rings 9 and 11 may be swung outwardly which allows of the withdrawal of the two outer molds. No steam whatever will be wasted during this operation since the rings 9 and 11 are not disconnected from their respective sources and the circulation of steam may continue throughout the operation. For the removal of the inner molds, the forms 3 and 4 are swung outwardly, which operation does not interfere in any way with the curing of the outer molds, so that each of the molds is individually accessible without any disturbance of the other molds.

Particular attention should be called to the ease with which an arrangement of this character may be operated, very little strength being necessary to swing the various elements upon their respective hinges, and no steam escaping during the entire operation to interfere with the operations of the attendant.

I claim:

1. In a tire vulcanizing apparatus, annular molds adapted to receive tires therein, a hollow ring formed with an internal hollow flange allowing molds to be inserted thereinto from opposite sides so as to lie against the side of the flange and the inner periphery thereof, hollow rings made for engagement with the outer faces of the molds and means for circulating steam through the hollow spaces.

2. In a tire vulcanizing apparatus, a stationary hollow ring mounted in a vertical plane, a plurality of molds allowing tires to be placed therein, two hollow rings having internal hollow flanges hingedly connected with the first ring so as to form chambers for the reception of the molds on opposite sides of the first ring, two other hollow rings hinged to the second hollow rings arranged to form additional chambers for molds with the flanges and means for circulating steam through the hollow spaces in the rings.

3. In a tire vulcanizing apparatus, a stationary hollow ring mounted in a vertical plane, a plurality of molds allowing tires to be placed therein, two hollow rings having internal hollow flanges hingedly connected with the first ring so as to form chambers for the reception of the molds on opposite sides of the first ring, two other hollow rings hinged to the second hollow rings arranged to form additional chambers for molds with the flanges and means for circulating steam through the hollow spaces in the rings, the latter means being made to remain undisturbed by swinging the rings on their respective hinges.

4. In a tire vulcanizing apparatus, a stationary hollow ring mounted in a vertical plane, a plurality of molds allowing tires to be placed therein, two hollow rings having internal hollow flanges hingedly connected with the first ring so as to form chambers for the reception of the molds on opposite sides of the first ring, two other hollow rings hinged to the second hollow rings arranged to form additional chambers for molds with the flanges and means for circulating steam through the hollow spaces in the rings, the latter means including pipes having swivel joints arranged to allow the pipes to partake of the swinging motion of the rings without interrupting the circulation of the steam.

ARGE LEO JACOBSON.